United States Patent [19]

Hollander

[11] Patent Number: 5,652,850
[45] Date of Patent: Jul. 29, 1997

[54] PANEL CREATION ENGINE USING TEMPLATES TO AUTOMATICALLY CONFIGURE USER INTERFACE SCREEEN DISPLAYS

[75] Inventor: Frank T. Hollander, Arlington, Tex.

[73] Assignee: AST Research, Inc., Irvine, Calif.

[21] Appl. No.: 475,788

[22] Filed: Jun. 7, 1995

[51] Int. Cl.$^6$ .................................................. G06T 11/00
[52] U.S. Cl. ........................ 395/333; 395/339; 395/348
[58] Field of Search ................................. 395/326, 333, 395/334, 339–351

[56] References Cited

U.S. PATENT DOCUMENTS 5,404,528  4/1995  Mahajan ................................. 395/650

OTHER PUBLICATIONS

Goodman "The Complete Hypercard 2.2 Handbook" 1993 pp. 18, 19, 103–138, 183–214, 226–232, 963–1102.
Don Hopkins, *The Design And Implementation Of Pie Menus*, Dr. Dobb's Journal, Dec. 1991, pp. 16–18, 20, 22, 24, 26 and 94.

Primary Examiner—Almis R. Jankus
Attorney, Agent, or Firm—Haynes and Boone, L.L.P.

[57] ABSTRACT

A system for use in a computer having a display for automatically configuring graphical user interface ("GUI") display panels comprising buttons for representing groups, or suites, of related items in a visually attractive manner. In a preferred embodiment, a panel creation engine processes a series of script files to determine, for each group of related items to be displayed as a single suite, an appropriate background template or preprocessed background bitmap and an appropriate button template to be used in representing the suite on the display, based on desired color depth. In particular, the panel creation engine processes a panel location script ("PLS") file to locate, for each suite, a panel configuration script ("PCS") file associated with the suite. Each PCS file is then processed to determine the number of items in the suite, and therefore the number of buttons to be displayed on the suite panel, as well as to identify the background template script file or preprocessed background bitmap file and the button template script file to be used in displaying the suite. Once the number of items has been determined, the appropriate button template script file is processed to determine the appearance and relative placement of each button to be displayed. In addition, if a background template script file, rather than a preprocessed bitmap file, is identified, the template file is processed to create an output bitmap for defining the appearance of the panel upon which the buttons are overlaid at runtime.

35 Claims, 5 Drawing Sheets

PANEL CREATION ENGINE USING TEMPLATES TO AUTOMATICALLY CONFIGURE USER INTERFACE SCREEEN DISPLAYS

TECHNICAL FIELD

The invention relates generally to user interfaces for computers and, more particularly, to a panel creation engine for automatically configuring the contents of certain screen displays of a graphical user interface.

BACKGROUND OF THE INVENTION

Graphical user interfaces, or "GUIs" as they are often designated, have become an increasingly common and popular feature of computers, especially personal computers (PCs). One of the many advantages of such GUIs is that they allow a user to enter commands by selecting and manipulating graphical display elements, such as icons or buttons, usually with a pointing device, such as a mouse. A mouse is an input device which, when moved over a surface, moves a mouse pointer across the PC display in a corresponding manner. Typically, a mouse has at least two buttons which when pressed, generate to the PC an input relating the user and the location of the mouse pointer on the PC display. "Clicking" will be used herein to refer to the pressing and releasing of a mouse button, usually the left mouse button, unless otherwise specified. The icons of a GUI are designed to behave in a manner similar to the objects they represent. The Apple Macintosh user interface and Microsoft Windows operating environment are two common and very popular examples of GUIs, illustrating the fact that the advantages of GUIs over conventional text-based user interfaces are widely recognized.

Clearly, GUIs significantly reduce the amount of information that a user must recall in order effectively to use the PC. For example, instead of having to remember the name of an application program and the location of the program on a particular disk and within a particular folder or directory, the user need only remember the icon or button associated with the application.

Most PC manufacturers make available a variety of different product configurations to appeal to and suit the needs and desires of various consumer markets. In particular, different product configurations typically vary in terms of what software is preinstalled, or "bundled," on the PC. For example, the software bundled on an inexpensive low-end PC usually differs from that bundled on a more expensive high-end PC in type, quantity or both. Although this is an effective marketing technique, such variations can interfere with the desire of most manufacturers to provide an attractive visual presentation, via a GUI window, of what software resides on the PC, because each different product configurations tends to require customized art work or some other labor-intensive configuration task in order effectively to present the bundled software to the user.

For example, as more fully described in commonly-owned copending U.S. patent application Ser. No. 08/452, 068, filed May 26, 1995 pending, the disclosure of which is hereby incorporated by reference in its entirety, the software bundled on a PC may be presented to the user in the form of "software suites." As described in that application, each software suite comprises a compound computer display object that provides a single integrated visual representation of multiple related application programs, documents and/or data files (hereinafter collectively designated "items"). In particular, the related items constituting a software suite are represented by icons, or buttons, overlaid on an attractive background comprising a software suite window, or panel, associated with the software suite. For example, the software bundled on all PCs of a particular manufacturer may be presented to a user via an "Edutainment" software suite for presenting applications and files related to education and entertainment, a "Financial" software suite for presenting for applications and files related to finances, and a "Telephony" software suite for presenting applications and files related to telephone applications.

While it is anticipated that the use of such software suites and the like will simplify the user's mental model of the totality of software bundled on the PC, as well as provide a vehicle by which relatively more important bundled applications can be brought to the user's attention, the effective use of software suites is complicated by the fact that, as indicated above, a single PC manufacturer may produce a number of different product configurations, each having bundled thereon a different combination of software. For example, one particular product configuration may include five items for display via an Edutainment software suite and three items for display via a Financial software suite, while another configuration includes seven items for display via its Edutainment software suite and five items for display via its Financial software suite. Because the relative placement of the buttons, and possibly other elements, within each suite window will depend, at least in part, on the number of items to be represented in the suite, it is conceivable that a manufacturer will have to have a separate software suite window configuration designed for each of the possible combinations of related items that may be preinstalled on a PC. When one considers that, for a single manufacturer, there may be several different groups of related items (e.g., "Edutainment," "Financial," etc.) that may be preinstalled on a PC and that each different group may comprise a different number of items, depending on the product configuration of the PC, it is obvious that the attractive presentation of such bundled software can involve a substantial amount of labor and expense on the part of the manufacturer.

One solution to this problem takes advantage of the ability of GUIs automatically to configure themselves based on variables not known to a programmer at the time the GUI is designed. For instance, a window displaying a directory of files on a file system will have to read the appropriate directory and list all the files it finds, while appropriately formatting the data as it is discovered. This solution is deficient in several respects. For instance, the files in the directory may be presented as identically-sized icons in a fixed-size window, arranged in some type of predefined (e.g., alphabetical) order from left to right, top to bottom. If there are too many files to fit in the window, a scrolling mechanism is provided. This solution may serve the structural needs of programmers, but does not allow for a visually attractive presentation that might be more appropriate for other environments.

Therefore, what is needed is a system for automatically configuring GUI screen displays for presenting bundled software for a variety of PC product configurations in a visually attractive and effective manner.

SUMMARY OF THE INVENTION

The foregoing problems are solved and a technical advance is achieved by a system for use in a computer having a display for automatically configuring GUI display panels comprising icons, or buttons, for representing groups of related applications and other files (hereinafter collectively designated "items") in a visually attractive manner. In a departure from the art, a panel creation engine of the present invention processes a series of script files to determine, for each group of related items to be displayed in a single suite, an appropriate background template or preprocessed background bitmap and an appropriate button template to be used in representing the suite on the display, based on desired color depth.

In a preferred embodiment, the panel creation engine processes a panel location script ("PLS") file to locate, for each suite, a panel configuration script ("PCS") file associated with the suite. Each PCS file is then processed to determine the number of items in the suite, and therefore the number of buttons to be displayed on the suite panel, as well as to determine the background template script file or preprocessed background bitmap file and the button template script file to be used in creating the suite window or panel. Once the number of items has been determined, the identified button template script file is processed to locate a "ButtonPosition" entry corresponding to that number of items. The data contained in the corresponding ButtonPosition entry identifies, for each of the items, the relative placement of the button on the panel. In addition, if a background template script file, rather than a preprocessed bitmap file, is identified, the identified template file is processed to locate a "Background" entry corresponding to the number of items in the suite, as previously determined, and indicating a bitmap to be used as the background of the panel, as well as any "BitmapLayer" entries corresponding to that number, which entries indicate bitmaps to be overlaid on the background bitmap to create an output bitmap for defining the appearance of the panel. The buttons are overlaid on the panel at runtime in the appropriate positions, as determined above. In one aspect of the invention, the panel configuration data for each suite generated during the above processing is stored in a Windows Registry value associated with the suite.

A technical advantage achieved with the invention is that it streamlines the process of configuring software for a variety of product configurations, while maintaining the visually attractive elements thereof.

A further technical advantage achieved with the invention is that it reduces the amount of original artwork that must be created for each different product configuration.

DESCRIPTION OF THE PREFERRED EMBODIMENTS

Figure 1A:
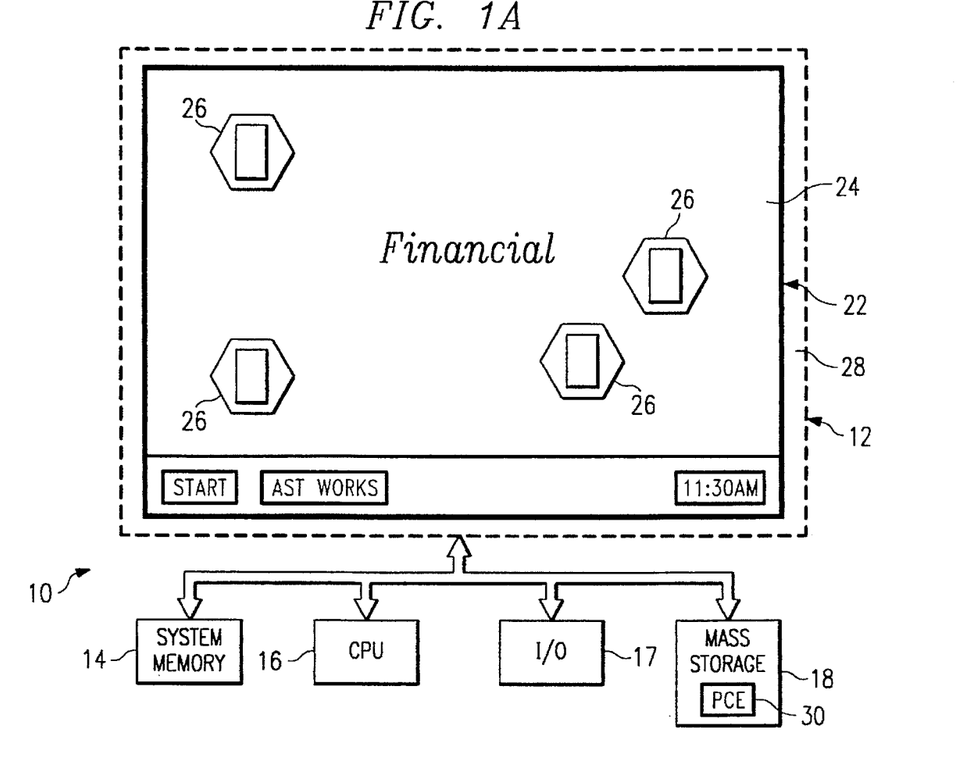
FIG. 1A is a system block diagram of a computer for implementing the panel creation engine of the present invention and a Financial software suite generated by same.

As used herein, the term "software suite" designates a compound computer display object that provides a single integrated visual representation of multiple application programs or files, hereinafter collectively referred to as "items." The operation of such software suites is described in greater detail in the aforementioned commonly-owned cop ending U.S. patent application Ser. No. 08/452,068 and therefore will not be further described herein, except to the extent necessary to facilitate a complete understanding of the present invention. FIG. 1 is a system block diagram of a computer 10 embodying features of the present invention. As shown in FIG. 1, the computer 10 comprises a display 12, system memory 14, a CPU 16, a mass storage device 17 and other I/O devices 18 interconnected via one or more computer buses, such as a system bus 20. A software suite 22, comprising a window, or panel, 24 and a plurality of buttons 26 for representing a plurality of related items, is overlaid on a desktop 28 of a graphical user interface (GUI). In the illustrated embodiment, the desktop 28 represents the desktop view of Microsoft Corporation's Windows 95 GUI operating system, although it is anticipated that the system of the present invention may be implemented in any number of different GUI operating systems and environments. As will be described in greater detail with reference to FIGS. 2A–2E, the software suite 22 is dynamically created, based on the number of items in the suite, during setup of the computer 10 by a panel creation engine 30 comprising software stored on the mass storage device 18.

It is contemplated that the background appearance of the suite panel of each suite is preferably customizable to provide an attractive visual indication of the type of items included in the suite. For example, as shown in FIG. 1A, the suite panel 24 includes the name of the suite, e.g., "Financial," written in an attractive script across the suite panel. Moreover, although all the buttons 26 are shown in FIG. 1A as having similar dimensions and shapes, in an alternative embodiment, the dimensions of the buttons 26 may be varied, thereby enabling the manufacturer or user of the computer 10 to increase the visual appeal of buttons representative of relatively more significant items in the suite, as well as to draw the user's attention to certain items, particularly setup programs, that should be executed first.

Figure 1B:
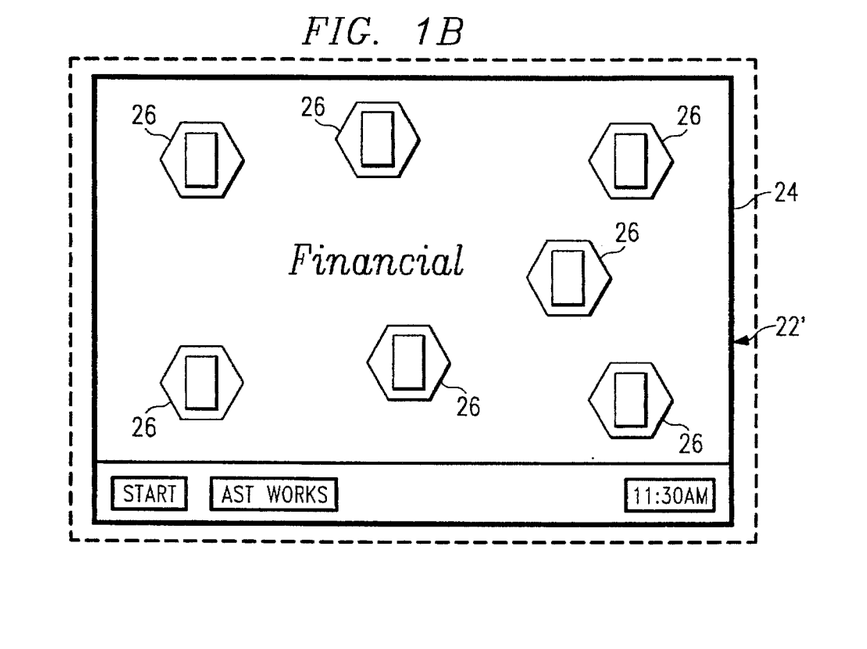
FIG. 1B illustrates an alternative embodiment of a Financial software suite for an alternative configuration of the computer of FIG. 1A.

FIG. 1B illustrates an alternative embodiment of the software suite 22, designated by a reference numeral 22'. As shown in FIG. 1B, the suite 22' is similar in all respects to the suite 22, except that it comprises six (6), rather than four (4), buttons 26. As will be described in detail below, it is a feature of the present invention automatically to reconfigure the appearance of the suite 22 depending on the number of items associated with, and therefore the number of buttons to be displayed in, the suite.

In accordance with a feature of the present invention, a separate template is used for creating a visual representation of each class (e.g., "Financial," "Edutainment," "Telephony") of software suites. In particular, each template defines the appearance and placement of elements within the panel. For a given class of panels, or suites, the configuration, based on the defined template, will be visually similar, but will be created dynamically based on the configuration of the computer on which the panel creation engine is installed. For example, as shown in FIGS. 1A and 1B, the appearances of the suites 22 and 22' are generally similar, the difference being the number and placement of buttons thereon, which is dependent on the number and identity of items comprising the suite installed on the particular computer. A single template will be used across all configurations for a given class of panels and the panel creation engine will dynamically configure the panels based, for example, on which applications are listed in the configuration script and installed on the computer.

An illustrative analogy is provided by the design of standard playing cards. Such playing cards are designed to be both attractive and functional, yet their visual design follows a strict set of rules that can be collected into a template similar to the templates used herein. For example, each card in the deck can be described by its suit (e.g., heart, club, diamond, spade) and its rank (e.g., ace through king). A software template for a standard playing card would describe the physical size of the card, the placement of the pips on the background thereof, as dictated by the card's rank (for cards of ranks one through ten), and the symbol to be used in representing those pips, as dictated by the suit of the card. Special graphics are needed for the face cards, as well as jokers and perhaps other cards, and might also comprise part of the template. The template could also allow for variations in the design of the symbol used to represent each suit and possibly in the definition of the suits themselves.

This invention is similar to the template described above for designing standard playing cards, with one suit being roughly equivalent to a class of panels (e.g., "Financial," "Edutainment,") and an individual card being roughly equivalent to one panel for a particular PC configuration (e.g., suite 22).

Figure 2A:
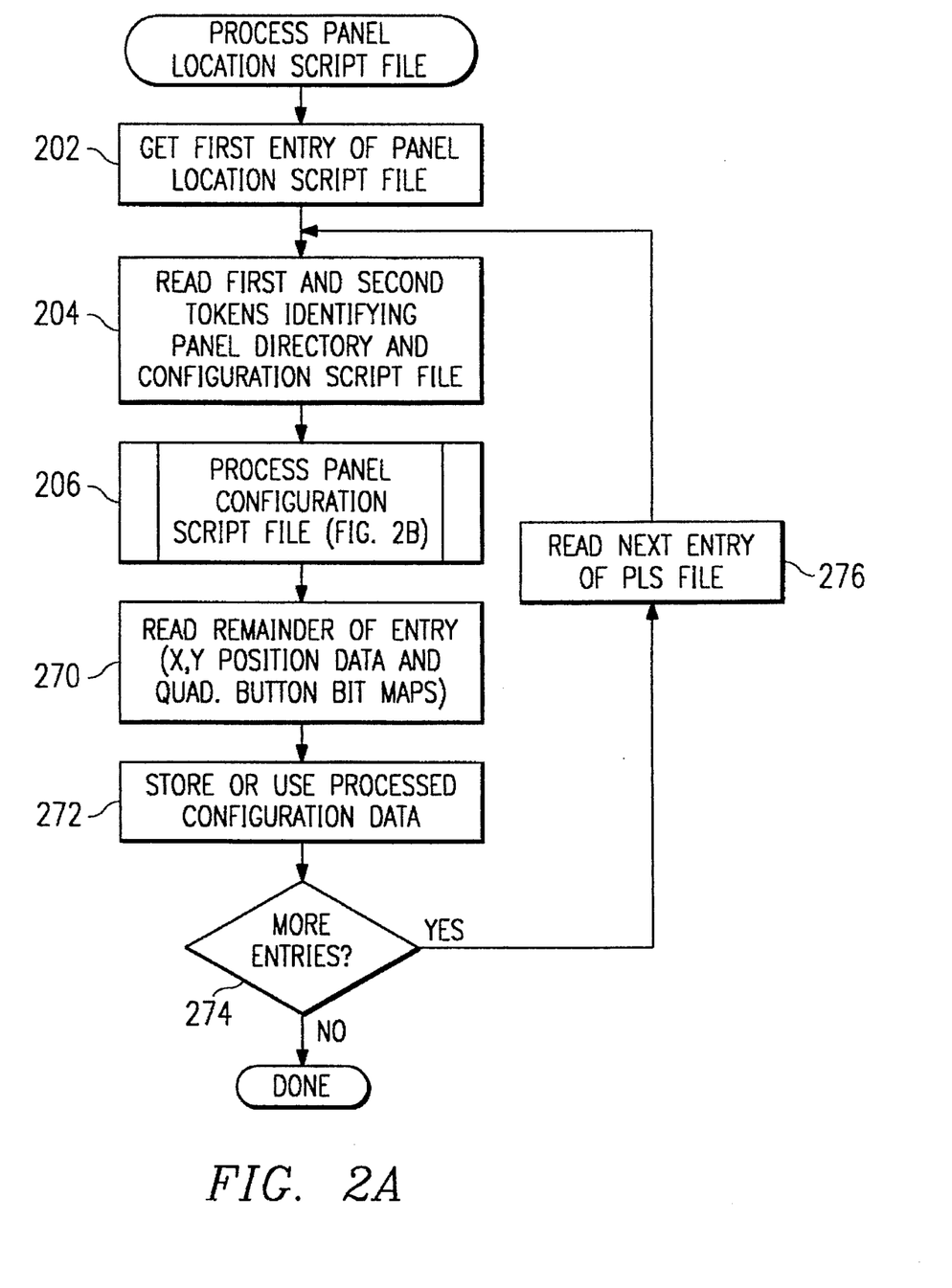
FIGS. 2A–2E comprise a flowchart of a preferred method of operation of the panel creation engine of the present invention.

FIGS. 2A–2E comprise a flowchart of the operation of the panel creation engine 30 (FIG. 1A) for implementing the automatic panel configuration method of the present invention. FIG. 2A is a flowchart of a Process Panel Location Script File routine implemented by the panel creation engine 30 for processing a panel location script ("PLS") file. The PLS file comprises a plurality of entries, each corresponding to a class of panels, or software suites, for display on the display 12. In particular, each entry of the PLS file identifies a location of a configuration script file for defining the appearance of the particular panel for that class, as well as (x, y) coordinates for specifying a default position of the software suite on the display and bitmap image files for defining the appearance of a quadrant button (not shown) that, when pressed, "launches," or opens, the suite. The following is an excerpt from an exemplary PLS file, designated "C:\TOPAZ\PANELS.TPZ":

"PANEL.TPZ," respectively, corresponding to a directory and filename, are read. In step 206, a script file identified by the first and second tokens of the entry, designated the panel configuration script ("PCS") file, is processed, as will be described in detail with reference to FIG. 2B. As will also be described, the PCS file identifies a background script or preprocessed background bitmap file, a button template script file, and item, or button, files for the panel.

The format of the first entry of the PCS file will either be "TEMPLATE <filename1> <filename2>," if a background template is to be used, in which case "filename1" identifies a file containing the high color background template script and "filename2" identifies a file containing the 16 color background template script, or "BACKGROUND <filename1> <filename2>," if a preprocessed background bitmap is to be used, in which case "filename1" identifies a file containing the high color bitmap file and "filename2" identifies a file containing a 16 color bitmap.

The format of the second entry of the PCS file is "BUTTONS <filename>," where "filename" identifies the file containing a button template script ("BuTS") for use in positioning the buttons on the panel, depending on the number of buttons to be displayed. The third and all subsequent entries of the PCS file comprise an ordered list of the items, or buttons, to be displayed on the panel. The following filenames are listed in the following order in each such entry:

a) shortcut, or "link," file for the item;
b) high color bitmap file for the "up" image of the button corresponding to the item;
c) high color bitmap file for the "down" image of the button corresponding to the item;

```
C:\TOPAZ\PANELS.TPZ:        //configuration lists panels with positions and quadrant
                              button images
>       C:\TOPAZ\PANELS\Telephony PANEL.TPZ X Y telup.bmp teledn.bmp telefc.bmp
        teleup16.bmp teledn16.bmp telefc16.bmp
>       C:\TOPAZ\PANELS\Edutainment PANEL.TPZ X Y edutup.bmp edutdn.bmp
        edutfc.bmp edutup16.bmp edutdn16.bmp edutfc16.bmp
.
.
.
```

As previously indicated, the PLS file includes an entry for identifying a location of the configuration script for defining the appearance of each class of panels to be displayed on the display 12. The PLS file shown above includes two such entries, one corresponding to a panel class designated "Telephony" and the other corresponding to a panel class designated "Edutainment," although it should be recognized that additional entries corresponding to other classes may be added. It should be noted that each entry includes both high color and 16 color bitmap files for each of "up," "down" and "focus" images of the quadrant buttons for the suite.

Referring to FIG. 2A, execution of the Process PLS File routine begins in step 200. In step 202, the first entry of the PLS file is retrieved. Referring to the PLS file shown above, the entry retrieved in step 202 would be:

C:\TOPAZ\PANELS\Telephony PANEL.TPZ X Y telup.bmp teledn.bmp telefc.bmp teleup16.bmp teledn16.bmp telefc16.bmp In step 204, the first and second tokens of the retrieved entry, in this case "C:\TOPAZ\PANELS\Telephony" and d) high color bitmap file for the "focus" image of the button corresponding to the item;

e) 16 color bitmap file for the "up" image of the button corresponding to the item;

f) 16 color bitmap file for the "down" image of the button corresponding to the item;

g) 16 color bitmap file for the "focus" image of the button corresponding to the item;

It should be noted that filenames may be surrounded by quotation marks to protect embedded spaces.

The following is an excerpt from an exemplary PCS file, designated "C:\TOPAZ\PANELS\Telephony\PANEL.TPZ":

```
C:\TOPAZ\PANELS\Telephony\PANEL.TPZ:        //hidden panel configuration script
>       TEMPLATE TELE.TPZ TELE16.TPZ               //background script for this panel
>       BUTTONS TELEBUTN.TPZ                        //button template script for this panel
>       "Cool Communications.LNK" COM1UP.BMP COM1DN.BMP COM1FC.BMP
```

```
          COM1UP16.BMP COM1DN16.BMP COM1FC16.BMP
     >    "Very Cool Communications.LNK" COM2UP.BMP COM2DN.BMP COM2FC.BMP
          COM2UP16.BMP COM2DN16.BMP COM2FC16.BMP
          C:\TOPAZ\PANELS\Telephony\Cool Communications.LNK         //link for panel
item
          C:\TOPAZ\PANELS\Telephony\Very Cool Communications.LNK    //link for panel item
```

Figure 2B:
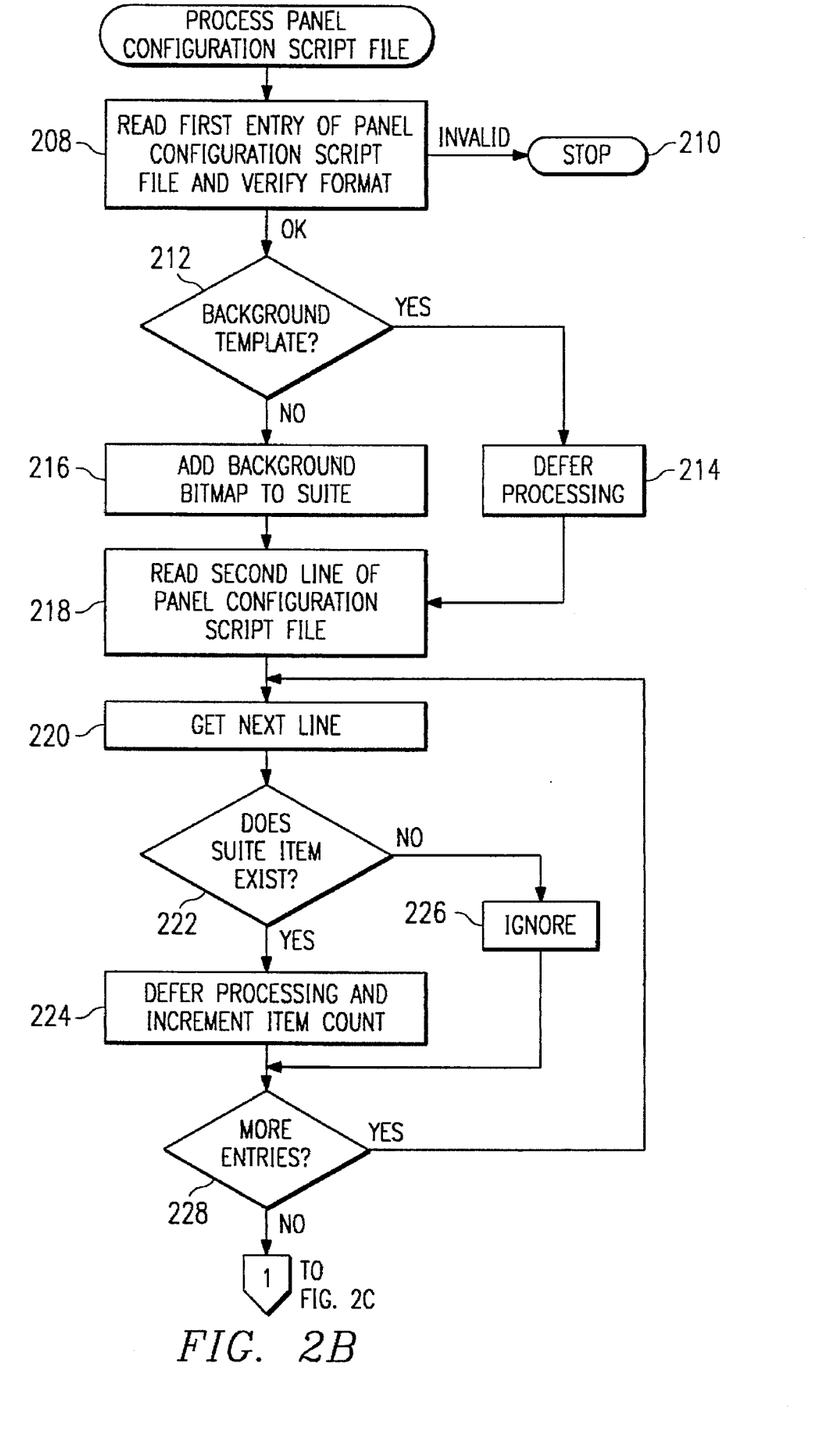
Figure 2C:
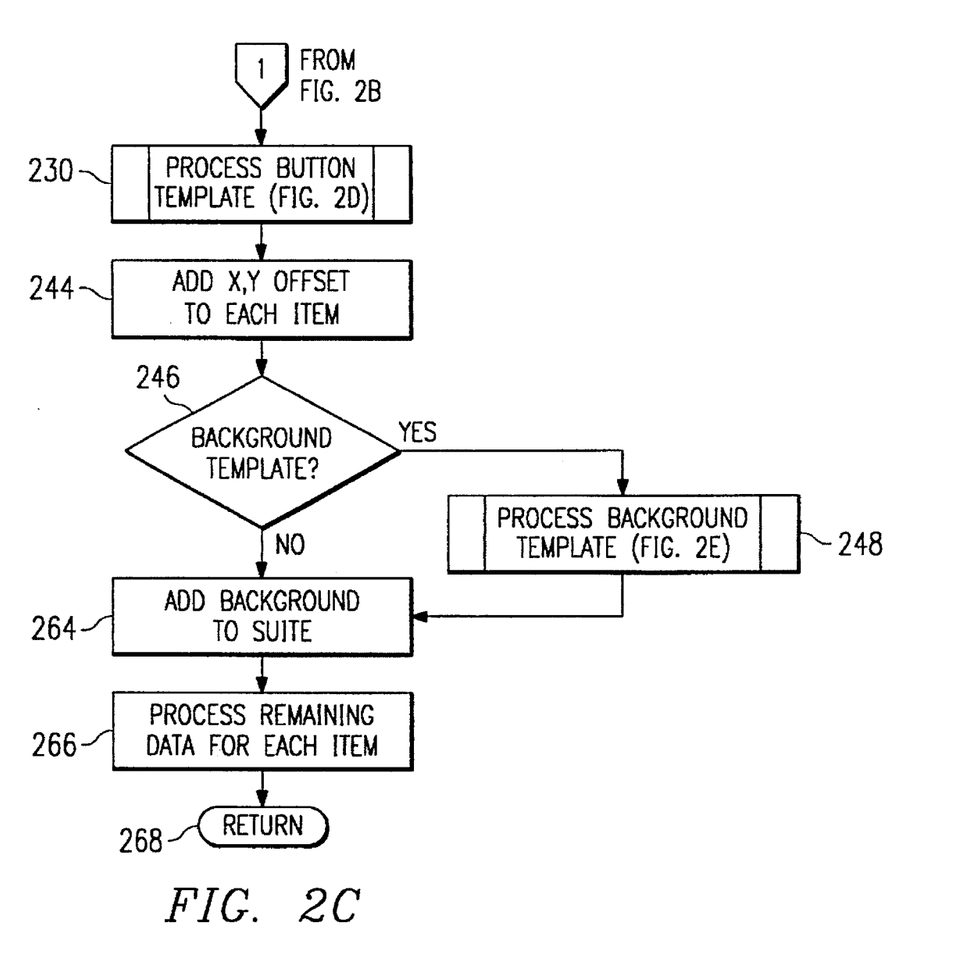

FIGS. 2B and 2C comprise a flowchart of a Process PCS File routine implemented by the panel creation engine 30 of the present invention. Referring now to FIGS. 2B and 2C and the exemplary PCS file shown above, in step 208, the first entry of the PCS file, i.e, "TEMPLATE TELE.TPZ TELE16.TPZ" is read and its format is verified. If the format of the entry is invalid, that is, if the first token thereof is neither TEMPLATE nor BACKGROUND, execution terminates in step 210; otherwise, execution proceeds to step 212. In step 212, a determination is made whether the entry corresponds to a background template. As indicated above, this is accomplished by determining whether the first token of the entry is "TEMPLATE." If the first entry corresponds to a background template, execution proceeds to step 214, in which processing of the background template is deferred until step 248 (FIG. 2C); otherwise, execution proceeds to step 216, in which the background bitmap identified by <filename> (for high color) or <filename2> (for 16 color) is added to the panel. In the preferred embodiment, data, including bitmaps, for each panel are stored in the Windows Registry in a Registry value associated with the panel, although it will be recognized by skilled artisans that such data could also be stored in a separate file associated with the panel. As will also be recognized by skilled artisans, the Windows Registry is a structured file in which is stored indexed configuration data and other information related to the system hardware and user preferences. Upon completion of step 214 or 216, execution proceeds to step 218.

In step 218, the second entry of the PCS file (i.e., "BUTTONS TELEBUTN.TPZ"), which identifies a button template script ("BuTS") file of the panel, is read. In step 220, the next entry of the PCS file (i.e, "Cool Communications.LNK' COM1UP.BMP COM1DN.BMP COM1FC.BMP COM1UP16.BMP COM1DN16.BMP COM1FC16.BMP"), corresponding to an item of the panel, is read. In step 222, a determination is made whether the item exists; i.e., whether the shortcut file identified in the current entry ("Cool Communications.LNK") exists. If so, execution proceeds to step 224, in which processing is deferred and a count of the number of items for the panel (i.e., the number of items listed in the PCS file) is incremented, and then to step 228. If in step 222, it is determined that the current item does not exist, execution proceeds directly to step 228. In step 228, a determination is made whether there are more item entries in the PCS file. If so, execution returns to step 220 and steps 220–228 are repeated until all of the PCS file entries have been counted. If in step 228 it is determined that there are no more entries in the file, execution proceeds to step 230. The PCS file shown above comprises two (2) items.

Figure 2D:
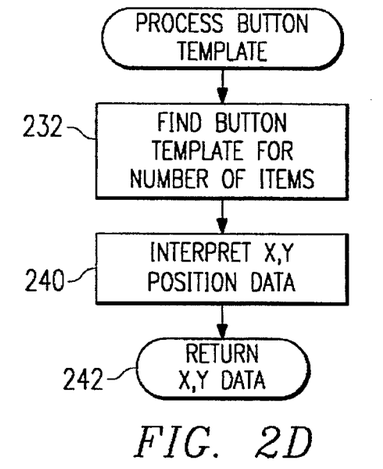

In step 230, a Process BuTS File routine, as shown in detail in FIG. 2D, is executed. The function of the Process BuTS File routine is to process the BuTS file, which file defines a button "template" for a class of panels, such as "Edutainment" or "Telephony." All entries of the BuTS file are in the following general format:

>n:token[data] //anything after the last "]" is a comment, n=0, 1, 2, ...

where "n" is the number of items, or buttons, to be displayed on the panel, "token" designates the type of entry, and "data" comprises a separate x, y coordinate pair for each of the n buttons of the panel, wherein each x, y coordinate pair indicates the position of the corresponding button relative to some predefined default location on the panel. Accordingly, there will be n (x, y) coordinate pairs for each entry.

The following is an exemplary entry of the BuTS file:

>n: ButtonPositions[(x1, y1,), (x2, y2), ... , (xn, yn)] //button positions on background bitmap Buttons defined using the BuTS file will be placed on the background at runtime using the button bitmaps identified in the PCS file.

The following is an excerpt from an exemplary BuTS file, designated "C:\TOPAZ\BIN\TELEBUTN.TPZ":

>1: ButtonPositions [(40,40)]

>2: ButtonPositions [(20, 40), (60, 40)]

>3: ButtonPositions [(20, 40), (60, 40), (40, 80)]

Referring to FIG. 2D, in step 232, the "BUTTON POSITION" entry corresponding to the number of items determined in steps 220–238 is retrieved. For example, if the number of items determined in steps 220–238 is "2", the entry "2: ButtonPositions[(20, 40), (60, 40]" is retrieved. In step 240, the (x, y) data for each item is processed and returned in step 242 to the Process PCS File subroutine (FIG. 2C).

Figure 2E:
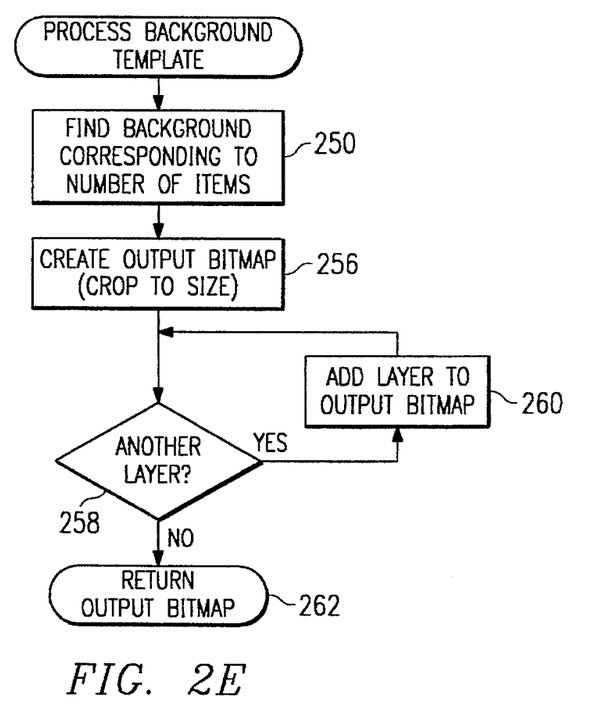

Referring again to FIG. 2C, in step 244, the (x, y) position data for each button is added to the respective item in the panel Registry value. In step 246, a determination is again made whether a background template is being used by determining whether the first entry in the PCS file begins with "TEMPLATE." If so, execution proceeds to step 248, in which a Process Background Template Script File routine, as shown in detail in FIG. 2E, is executed.

The background template script ("BaTS") file handles the definition of a background "template" for a class of panels, e.g., Telephony. All entries in the script are in the following general form:

>n:token[data] //anything after the last "]" is a comment, n=0, 1, 2 ...

where "n" corresponds to the number of items listed in the PCS file, "token" identifies whether the entry corresponds to a background or bitmap layer of the panel, and "data" identifies the file containing the bitmap to be used for the corresponding background or layer and the size or position of the background or layer, respectively.

Valid BaTS file entries include the following:

```
1. >n: Background[filename.bmp]          //background bitmap (full size)
2. >n: Background[filename.bmp (x1, y1, x2, y2)]   //background bitmap size = (x1, y1),
                                            origin is at (x2, y2) within file
3. >n: BitmapLayer1[filename.bmp (x,y)]   //first layer on top of bitmap, (x,y) indicates the
                                            location of the layer relative to the background
4. >n: BitmapLayer2[filename.bmp (x,y)]   //second layer on top of bitmap, (x,y) indicates
                                            the location of the layer relative to the
                                            background
5. >n: BitmapLayer3[filename.bmp (x,y)]   //third layer on top of bitmap, (x,y) indicates
                                            the location of the layer relative to the
                                            background
```

In the presently preferred embodiment, "n=0" serves as a default background for the template and can be overridden by other values. All buttons and bitmap layers are treated as transparent. In addition, as illustrated by the following excerpt from an exemplary BaTS file, designated "C:\TOPAZ\BIN\TELE.TPZ," for n=3, there can be multiple bitmap layers at a single level that will be used in the order listed in the BaTS file:

```
C:\TOPAZ\BIN\TELE.TPZ

>0: Background [telephone.bmp]

>1: BitmapLayer1[tele.bmp(100,12)]

>2: BitmapLayer2 [tele.bmp (100,12)]

>3: BitmapLayer1 [bmp3-1.bmp (0,30)]

>3: BitmapLayer2 [bmp3-2.bmp (0,60)]

>3: BitmapLayer3 [bmp3-3.bmp (0,90)]
```

As indicated above, for n=3, there will be three bitmap layers (BitmapLayer1, BitmapLayer2, BitmapLayer3) overlaid on the background (n=0) in that order. This enables various designs to be overlaid on a basic background, depending on the items contained in the suite.

Returning again to the playing card analogy discussed above, the "Background" is roughly equivalent to the background on the face of a playing card, typically solid white. The "BitmapLayers," then, are roughly equivalent to the designation of the card's rank and suit appearing in the corners thereof and depend on the number of pips, that is, the rank, of the card. Therefore, the "layer" used for a four of hearts would be different than that used for a six of hears. Other "layers" could be added to one or more individual cards to add additional decorative elements thereto, just as other BitmapLayers may be added to the output bitmap of a panel to add additional display features thereto.

Referring to FIG. 2E, in step 250, the background for the number of items determined in steps 220-238 is located. In the case of the BaTS file excerpt shown above, the first entry, "0: Background [telephone.bmp]" will be used, as there is no other entry in which the token is "Background". In step 256, an output bitmap is created using the information contained in the bitmap file associated with the background entry; specifically, "telephone.bmp." In step 258, a determination is made whether there is another layer, indicated by an entry in which "n" is equal to the number of items in the suite, in this case, two (2) and the token is "BitmapLayerx," where "x" designates the layer number, to be processed. If so, execution proceeds to step 260, in which the layer, as defined by its corresponding bitmap file (e.g., tele.bmp), is added to the output bitmap created in step 256 in a position relative to the output bitmap as defined by the x, y coordinates of the entry (e.g. (100, 12), and then returns to step 258. If it is determined in step 258 that there are no more layers to be processed, execution proceeds to step 262, in which the completed output bitmap is returned to the Process PCS File routine. In this case, for n=2, there is one layer ("BitmapLayer2 [tele.bmp (100,12)]") to be added to the output bitmap.

Referring again to FIG. 2C, once the background template has been processed in step 248, execution proceeds to step 264, in which the background is added to the suite, and then to step 266, in which the remaining PCS file data, (e.g., "C:\TOPAZ\PANELS\Telephony\Cool Communications.LNK," "C:\TOPAZ\PANELS\Telephony\Very Cool Communications.LNK") for each item is processed. In particular, the data for the item, for example, the bitmaps for the button, is structured so that it can be saved to the Registry. It is conceivable that in step 266, the button image could also be manipulated based on other factors such as the link file's icon or a mask to give the button a shape. If in step 246, a background template is not being used, indicating that a preprocessed background bitmap is to be used, execution proceeds directly to step 266. Execution returns to the Process PLS File routine in step 268.

Referring again to FIG. 2A, in step 270, the remainder of the current entry, including position and quadrant button bitmaps, are read and the processed suite data is used or stored in an appropriate location in the Registry in step 272. In step 274, a determination is made whether there are more entries in the PLS file to be processed. If so, execution proceeds to step 276, in which the next entry is obtained, and steps 204-274 until all of the entries in the file have been processed. At that point, execution proceeds to step 278, in which execution terminates.

In this manner, the panel creation engine 30 uses a finite number of background and button templates to dynamically generate a multitude of different panel configurations based on the configuration of, that is, the software installed on, the computer 10. Clearly, this substantially reduced the amount of work needed to custom design display panels for each different computer configuration.

It is understood that the present invention can take many forms and embodiments. The embodiments shown herein are intended to illustrate rather than to limit the invention, it being appreciated that variations may be made without departing from the spirit or the scope of the invention. For example, the visual placement of multimedia access buttons would depend on the number and type of buttons needed, based on the configuration, e.g., the presence of an ".AVI" file that has the same name as the .LNK file would imply the need for a separate, associated video button for initiating a video about the item. In addition, a template might be used to devise a special artistic treatment for up to a certain number of items, for example, ten (10), and use a more general formula for more than that number.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. In a computer electrically connected to a display, a method of automatically configuring each of a plurality of panels for presentation on said display, the method comprising:

for each panel to be presented on said display, accessing a panel configuration ("PC") file associated with said panel, said PC file comprising a list of graphical display elements ("GDEs") for display on said panel and identifying a background file for representing a background of said panel and a button template file comprising a plurality of button templates for defining relative positions of said GDEs on said panel;

counting a number of said GDEs listed in said PC file;

generating a background for said panel using said background file identified in said PC file;

accessing said button template file identified in said PC file, wherein each of said button templates of said identified button template file corresponds to a different number of GDEs to be displayed on said background;

reading said one of said button templates that corresponds to said counted number of GDEs; and     overlaying each of said GDEs on said background in said position defined by said read one of said button templates.

2. The method of claim 1 further comprising, prior to said accessing said PC file:

accessing a panel location ("PL") file stored in said computer, said PL file comprising, for each of said panels, an entry for identifying a location of said PC file associated with said panel; and     reading said one of said PL entries corresponding to said panel to be displayed.

3. The method of claim 1 wherein said background file comprises a preprocessed bitmap.

4. The method of claim 1 wherein said background file comprises a background template file, said creating further comprising processing said background file to locate a background bitmap corresponding to said counted number of items.

5. The method of claim 4 wherein said creating further comprises:

processing said background template file to locate a layer bitmap corresponding to said counted number of items; and     overlaying said layer bitmap on said background bitmap.

6. The method of claim 1 further comprising presenting said panel on said display in a location specified by said PC file.

7. The method of claim 1 wherein said GDEs comprise buttons for representing data files and applications.

8. In a computer electrically connected to a display, a method of automatically configuring each of a plurality of panels for presentation on said display, the method comprising:

for each panel to be presented on said display, accessing a panel configuration ("PC") file associated with said panel, said PC file comprising a list of graphical display elements ("GDEs") for display on said panel and identifying a background file for representing a background of said panel and a button template file comprising a plurality of button templates for defining relative positions of said GDEs on said panel;

counting a number of said GDEs listed in said PC file;

generating a background for said panel using said background file identified in said PC file;

accessing said button template file identified in said PC file, wherein each of said button templates of said identified button template file corresponds to a different number of GDEs to be displayed on said background;

reading said one of said button templates that corresponds to said counted number of GDEs; and     overlaying each of said GDEs on said background in said position defined by said read one of said button templates;

wherein said counting further comprises:

determining whether said computer comprises a data file or application corresponding to said GDE; and         counting said GDE only responsive to a determination that said computer comprises a data file or application corresponding to said GDE.

9. In a computer electrically connected to a display, a method of automatically configuring each of a plurality of panels for presentation on said display, the method comprising:

accessing a panel location ("PL") file stored in said computer, said PL file comprising, for each of said panels, an entry for identifying a panel configuration ("PC") file associated with said panel, said PC file comprising a list of graphical display elements ("GDEs") to be displayed on said panel and identifying a background file for representing a background of said panel and a button template file comprising a plurality of button templates for defining a position of each of said GDEs on said panel;

reading one of said PL file entries;

accessing said PC file identified by said read one of said PL file entries;

counting a number of said GDEs listed in said accessed PC file;

generating a background for said panel using said background file identified in said accessed PC file;

accessing said button template file identified in said accessed PC file, wherein each of said button templates of said identified button template file corresponds to a different number of GDEs to be displayed on said background;

reading said one of said button templates that corresponds to said counted number of GDEs; and     overlaying each of said GDEs on said background in said position defined by said read one of said button templates.

10. The method of claim 9 wherein said background file comprises a preprocessed bitmap.

11. The method of claim 9 wherein said background file comprises a background template file, said creating further comprising processing said background file to locate a background bitmap corresponding to said counted number of items.

12. The method of claim 11 wherein said creating further comprises:

processing said background template file to locate a layer bitmap corresponding to said counted number of items; and overlaying said layer bitmap on said background bitmap.

13. The method of claim 11 wherein said background template file is a script file.

14. The method of claim 9 further comprising presenting said panel on said display in a location specified by said PC file.

15. The method of claim 9 wherein said GDEs comprise buttons for representing data files and applications.

16. The method of claim 9 wherein said PL, PC and button template files are script files.

17. In a computer electrically connected to a display, a method of automatically configuring each of a plurality of panels for presentation on said display, the method comprising:

accessing a panel location ("PL") file stored in said computer, said PL file comprising, for each of said panels, an entry for identifying a panel configuration ("PC") file associated with said panel, said PC file comprising a list of graphical display elements ("GDEs") to be displayed on said panel and identifying a background file for representing a background of said panel and a button template file comprising a plurality of button templates for defining a position of each of said GDEs on said panel;

reading one of said PL file entries;

accessing said PC file identified by said read one of said PL file entries;

counting a number of said GDEs listed in said accessed PC file;

generating a background for said panel using said background file identified in said accessed PC file;

accessing said button template file identified in said accessed PC file, wherein each of said button templates of said identified button template file corresponds to a different number of GDEs to be displayed on said background;

reading said one of said button templates that corresponds to said counted number of GDEs and overlaying each of said GDEs on said background in said position defined by said read one of said button templates;

wherein said counting further comprises:
determining whether said computer comprises a data file or application corresponding to said GDE; and
counting said GDE only responsive to a determination that said computer comprises a data file or application corresponding to said GDE.

18. In a computer electrically connected to a display, an apparatus for automatically configuring each of a plurality of panels for presentation on said display, the apparatus comprising:

for each panel to be presented on said display, means for accessing a panel configuration ("PC") file associated with said panel, said PC file comprising a list of graphical display elements ("GDEs") for display on said panel and identifying a background file for representing a background of said panel and a button template file comprising a plurality of button templates for defining relative positions of said GDEs on said panel;

means for counting a number of said GDEs listed in said PC file;

means for generating a background for said panel using said background file identified in said PC file;

means for accessing said button template file identified in said PC file, wherein each of said button templates of said identified button template file corresponds to a different number of GDEs to be displayed on said background;

means for reading said one of said button templates that corresponds to said counted number of GDEs; and means for overlaying each of said GDEs on said background in said position defined by said read one of said button templates.

19. The apparatus of claim 18 further comprising, prior to said accessing said PC file:

means for accessing a panel location ("PL") file stored in said computer, said PL file comprising, for each of said panels, an entry for identifying a location of said PC file associated with said panel; and means for reading said one of said PL entries corresponding to said panel to be displayed.

20. The apparatus of claim 19 wherein said PL, PC and button template files comprise script files.

21. The apparatus of claim 18 wherein said background file comprises a preprocessed bitmap.

22. The apparatus of claim 18 wherein said background file comprises a background template file, said means for creating further comprising means for processing said background file to locate a background bitmap corresponding to said counted number of items.

23. The apparatus of claim 22 wherein said means for creating further comprises:

means for processing said background template file to locate a layer bitmap corresponding to said counted number of items; and means for overlaying said layer bitmap on said background bitmap.

24. The apparatus of claim 22 wherein said background template file comprises a script file.

25. The apparatus of claim 18 further comprising means for presenting said panel on said display in a location specified by said PC file.

26. The apparatus of claim 18 wherein said GDEs comprise buttons for representing data files and applications.

27. In a computer electrically connected to a display, an apparatus for automatically configuring each of a plurality of panels for presentation on said display, the apparatus comprising:

for each panel to be presented on said display, means for accessing a panel configuration ("PC") file associated with said panel, said PC file comprising a list of graphical display elements ("GDEs") for display on said panel and identifying a background file for representing a background of said panel and a button template file comprising a plurality of button templates for defining relative positions of said GDEs on said pane;

means for counting a number of said GDEs listed in said PC file;

means for generating a background for said panel using said background file identified in said PC file;

means for accessing said button template file identified in said PC file, wherein each of said button templates of said identified button template file corresponds to a different number of GDEs to be displayed on said background;

means for reading said one of said button templates that corresponds to said counted number of GDEs; and means for overlaying each of said GDEs on said background in said position defined by said read one of said button templates;

wherein said means for counting further comprises:

means for determining whether said computer comprises a data file or application corresponding to said GDE; and means for counting said GDE only responsive to a determination that said computer comprises a data file or application corresponding to said GDE.

28. An apparatus for enabling a plurality of panels for presentation on a display of a computer to be automatically configured according to information stored in said computer, the apparatus comprising:

for each of said panels to be presented on said display, a list of graphical display elements ("GDEs") to be displayed on said panel, a background file for representing a background of said panel and a button template file comprising a plurality of button templates for defining a position of each of said GDEs on said panel;

a panel creation engine stored in said computer for, for each panel to be presented on said display:

counting a number of said GDEs in said list of GDEs of said panel;

generating a background for said panel using said background file of said panel;

accessing said button template file identified of said panel, wherein each of said button templates of said button template file corresponds to a different number of GDEs to be displayed on said background;

reading said one of said button templates that corresponds to said counted number of GDEs; and overlaying each of said GDEs on said background in said position defined by said read one of said button templates.

29. The apparatus of claim 28 further comprising:

a panel configuration ("PC") file for each of said panels to be presented on said display, said PC file comprising said list of graphical display elements ("GDEs") to be displayed on said panel and identifying said background file and said button template file for said panel; and a panel location ("PL") file stored in said computer, said PL file comprising, for each of said panels, an entry for identifying said PC file for said panel.

30. The apparatus of claim 28 wherein said background file is a preprocessed bitmap.

31. The apparatus of claim 28 wherein said background file comprises a background template file and wherein said creating further comprises processing said background file to locate a background bitmap corresponding to said counted number of items.

32. The apparatus of claim 31 wherein said creating further comprises:

processing said background template file to locate a layer bitmap corresponding to said counted number of items; and overlaying said layer bitmap on said background bitmap.

33. The apparatus of claim 28 wherein said panel creation engine presents said panel on said display in a location specified by said PC file.

34. The method of claim 28 wherein said GDEs comprise buttons for representing data files and applications.

35. An apparatus for enabling a plurality of panels for presentation on a display of a computer to be automatically configured according to information stored in said computer, the apparatus comprising:

for each of said panels to be presented on said display, a list of graphical display elements ("GDEs") to be displayed on said panel, a background file for representing a background of said panel and a button template file comprising a plurality of button templates for defining a position of each of said GDEs on said panel;

a panel creation engine stored in said computer for, for each panel to be presented on said display:

counting a number of said GDEs in said list of GDEs of said panel;

generating a background for said panel using said background file of said panel;

accessing said button template file identified of said panel, wherein each of said button templates of said button template file corresponds to a different number of GDEs to be displayed on said background;

reading said one of said button templates that corresponds to said counted number of GDEs; and overlaying each of said GDEs on said background in said position defined by said read one of said button templates;

wherein said counting further comprises:

determining whether said computer comprises a data file or application corresponding to said GDE; and counting said GDE only responsive to a determination that said computer comprises a data file or application corresponding to said GDE.

* * * * *